(12) United States Patent
Nomi et al.

(10) Patent No.: US 12,001,668 B2
(45) Date of Patent: Jun. 4, 2024

(54) DATA COMMUNICATION METHOD

(71) Applicant: Wacom Co., Ltd., Saitama (JP)

(72) Inventors: Tsukasa Nomi, Tokyo (JP); Haruhiko Hisano, Kanagawa (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/343,449

(22) Filed: Jun. 28, 2023

(65) Prior Publication Data

US 2023/0359342 A1 Nov. 9, 2023

Related U.S. Application Data

(63) Continuation of application No. 17/843,913, filed on Jun. 17, 2022, now Pat. No. 11,726,650, which is a continuation of application No. 17/216,022, filed on Mar. 29, 2021, now Pat. No. 11,372,535, which is a
(Continued)

(30) Foreign Application Priority Data

Aug. 31, 2018 (JP) ................. 2018-162220

(51) Int. Cl.
| | |
|---|---|
| *G06F 3/0487* | (2013.01) |
| *G06F 3/0354* | (2013.01) |
| *G06F 3/044* | (2006.01) |
| *G06F 3/04842* | (2022.01) |
| *G06F 3/04883* | (2022.01) |

(52) U.S. Cl.
CPC ........ *G06F 3/0487* (2013.01); *G06F 3/03545* (2013.01); *G06F 3/0441* (2019.05); *G06F 3/0442* (2019.05); *G06F 3/04842* (2013.01); *G06F 3/04883* (2013.01); *G06F 2203/0384* (2013.01)

(58) Field of Classification Search
CPC .. G06F 3/0441; G06F 3/0442; G06F 3/03545; G06F 2203/041
See application file for complete search history.

(56) References Cited

U.S. PATENT DOCUMENTS

| | | | |
|---|---|---|---|
| 8,661,429 B2 * | 2/2014 | Ruster | ...................... G06F 8/65 |
| | | | 717/173 |
| 9,265,074 B2 | 2/2016 | Liu et al. | |
| 2014/0347328 A1 | 11/2014 | Edgecomb et al. | |

(Continued)

FOREIGN PATENT DOCUMENTS

| | | |
|---|---|---|
| JP | 2013045441 A | 3/2013 |
| WO | WO 2018155205 A1 | 8/2018 |

*Primary Examiner* — Robin J Mishler
(74) *Attorney, Agent, or Firm* — Seed IP Law Group LLP (57) ABSTRACT

A data communication a system including: a stylus including a pen point electrode; a sensor controller; and a host processor. The stylus of data communication system is configured to transmit a pen signal with an electric field by capacitive coupling between the pen point electrode and a sensor electrode group; report, by the sensor controller, a position of the stylus in an operation surface to the host processor in response to detection of the pen signal by the sensor electrode group; supply, by the host processor, data to the sensor controller; and transmit, by the sensor controller, the data to the stylus in a stylus detection period in which the pen signal that is detected by the sensor electrode group indicates that the stylus is present within a predetermined distance from the operation surface.

15 Claims, 8 Drawing Sheets

Related U.S. Application Data continuation of application No. 16/534,498, filed on Aug. 7, 2019, now Pat. No. 10,990,269.

(56) References Cited

U.S. PATENT DOCUMENTS

| | | |
|---|---|---|
| 2015/0317021 A1 | 11/2015 | Park et al. |
| 2017/0235560 A1* | 8/2017 | McLean .............. G06F 3/03545 717/168 |
| 2018/0129312 A1* | 5/2018 | Westhues .............. G06F 3/0442 |
| 2018/0188836 A1 | 7/2018 | Park |
| 2018/0260077 A1 | 9/2018 | Westhues et al. |

* cited by examiner

DATA COMMUNICATION METHOD

DESCRIPTION OF THE RELATED ART

Systems in which data is transmitted/received between two computers through an input stylus have been known. U.S. Pat. No. 9,265,074 (hereinafter, referred to as Patent Document 1) discloses an example of these kinds of systems.

BACKGROUND

Technical Field

The present invention relates to a data communication method, and in particular, to a data communication method that is executed by a system including a host processor, a sensor controller, and a stylus.

In the system of Patent Document 1, a stylus (pen device 105) is configured to establish communication with each of two mobile computers (mobile devices 110 and 120) by any of Bluetooth (registered trademark), wireless fidelity (Wi-Fi) (registered trademark), and near field communication (NFC). Through this communication, data is transmitted from one of the computers to the stylus and the data is then forwarded from the stylus to the other of the computers.

Incidentally, some of computers that support pen input with a stylus establish bidirectional communication with the stylus, to thereby detect the position of the stylus or receive data (for example, pen pressure value) that the stylus has acquired. In the following, a signal that is transmitted from a stylus to a computer through this bidirectional communication is referred to as "pen signal," and a signal that is transmitted from the computer to the stylus through this bidirectional communication is referred to as "uplink signal."

In a case where data needs to be transmitted from a computer that supports such bidirectional communication to a stylus as in the above-mentioned system, it is conceivable that when the data is transmitted/received with the use of an uplink signal, there is no need for the stylus to include a communication device that supports, for example, Bluetooth (registered trademark), Wi-Fi (registered trademark), or NFC, unlike the system of Patent Document 1, which leads to reductions in size and weight of the stylus.

However, the inventor of the subject application has studied data transmission with an uplink signal and found that a stylus is sometimes moved out of a communicable region during transmission because the data communication speed of an uplink signal is low with respect to the size of data to be transmitted. When a computer continues transmission of the data under such a state, the data is not normally received by the stylus, thereby being leaked. Then, the data is possibly intercepted by an unrelated communication device. A solution to such a problem is desired.

BRIEF SUMMARY

One or more embodiments are directed to a data communication system capable of reducing a possibility that when large data is transmitted from a computer to a stylus with the use of an uplink signal, the data to be transmitted is intercepted.

At least one embodiment is directed to a data communication system comprising: a stylus configured to transmit a pen signal with an electric field by capacitive coupling between a pen point electrode and a sensor electrode group; report, by a sensor controller coupled to the sensor electrode group, a position of the stylus at an operation surface to the host processor in response to detecting the pen signal by the sensor electrode group, wherein the host processor is coupled to the sensor controller; supply, by the host processor, data to the sensor controller; and transmit, by the sensor controller, the data to the stylus in a stylus detection period, wherein in the stylus detection period, the pen signal detected by the sensor electrode group indicates that the stylus is present within a predetermined distance from the operation surface.

The data is transmitted in the stylus detection period, and the sensor controller can therefore be prevented from transmitting the data when the stylus is not at a position at which the stylus can receive the data to be transmitted, to thereby leak the data. It is therefore possible to reduce the possibility that when large data is transmitted from the computer to the stylus with the use of an uplink signal, the data to be transmitted is intercepted.

DETAILED DESCRIPTION

Now, embodiments of the present disclosure are described in detail with reference to the attached drawings.

Figure 1:
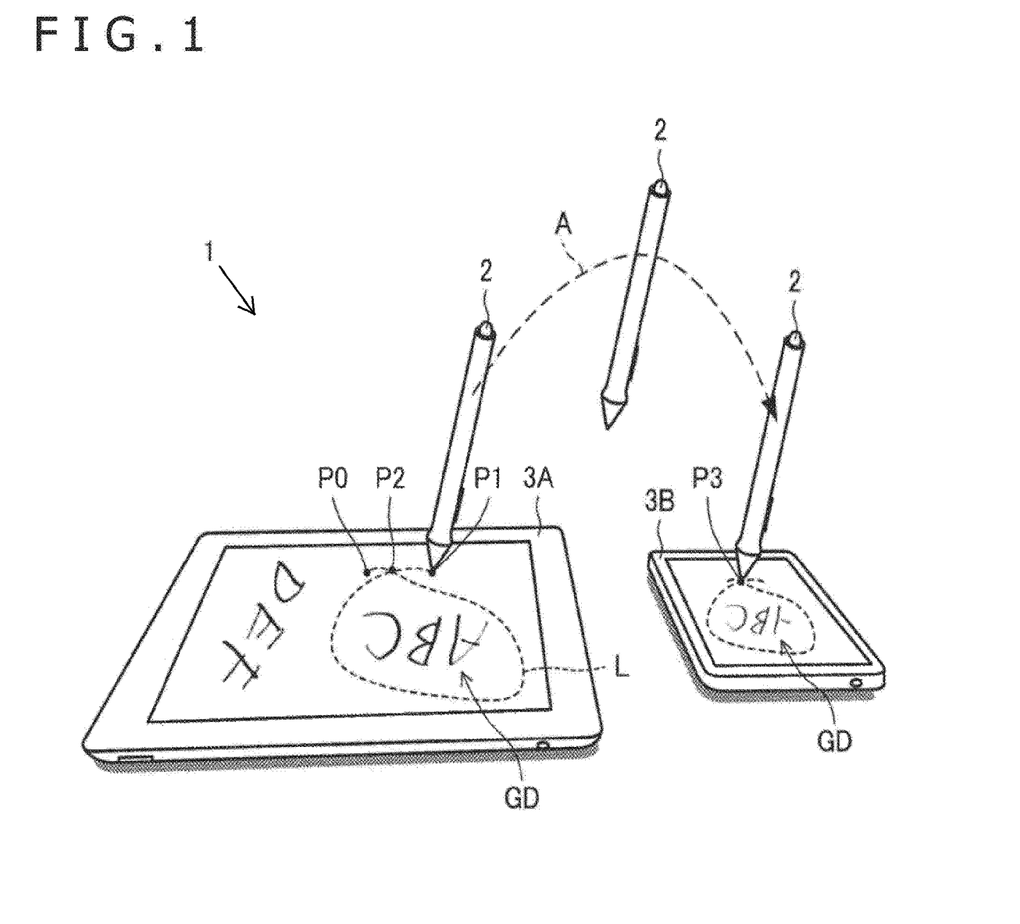
FIG. 1 is a diagram illustrating the system configuration of a data communication system configured to execute a data communication method according to a first embodiment of the present disclosure.

FIG. 1 is a diagram illustrating the system configuration of a data communication system 1 configured to execute a data communication method according to a first embodiment of the present disclosure. As illustrated in FIG. 1, the data communication system 1 includes a stylus 2 and two computers 3A and 3B.

The stylus 2 is a pen-type input device configured to execute pen input to the computers 3A and 3B. Further, each of the computers 3A and 3B is a mobile computer that supports pen input, and is typically a tablet terminal or a smartphone as illustrated in FIG. 1. As the computers 3A and 3B, however, other kinds of computers such as desktop computers connected digitizers can be used. Note that, in the following description, the computers 3A and 3B are sometimes collectively referred to as "computer 3" in a case where there is no need to distinguish the computers 3A and 3B from each other.

The stylus 2 and the computer 3 are configured to execute bidirectional communication with an electric field through capacitive coupling between a pen point electrode 21 and a sensor electrode group 11, which are described later with reference to FIG. 2. As described above, a signal that is transmitted from the stylus 2 to the computer 3 through this bidirectional communication is herein referred to as "pen signal," and a signal that is transmitted from the computer 3 to the stylus 2 through this bidirectional communication is herein referred to as "uplink signal."

The pen signal that is transmitted from the stylus 2 includes a burst signal (unmodulated signal) with which the computer 3 detects the position of the stylus 2, and a data signal indicating various pieces of data that are transmitted from the stylus 2 to the computer 3. Examples of the various pieces of data that are transmitted with the data signal include a pen identification (ID) that is stored in advance in a memory, which is not illustrated, in the stylus 2, and a pen pressure value WP detected by a pen pressure detector 22 (see FIG. 2 referred to later) in the stylus 2. The computer 3 receives a pen signal through the sensor electrode group 11, to thereby detect the position of the stylus 2 in an operation surface on the basis of the received burst signal, and demodulate the received data signal to receive data that the stylus 2 has transmitted.

The stylus 2 may transmit a pen signal in a way that the stylus 2 transmits a pen signal every time the stylus 2 receives an uplink signal (polling method) or a way that the stylus 2 transmits a pen signal on the basis of a transmission schedule that is determined from the reception timing of an uplink signal (time slot method). In the latter case, the computer 3 may transmit an uplink signal in the first time slot of a communication period that has a predetermined time length and is divided into a plurality of time slots, and the stylus 2 may transmit a pen signal with the use of the remaining time slots. The following description is made on the assumption that bidirectional communication is performed between the stylus 2 and the computer 3 by such a time slot method.

The computer 3 is configured to execute a drawing application that supports pen input with the stylus 2, and supplies, every time the computer 3 receives a pen signal from the stylus 2, the detected position and the received data to the drawing application while executing the drawing application. The drawing application has roles of forming, on the basis of a series of positions and data supplied in this way, stroke data (data including a series of positions of the stylus 2 detected in an period from pen-down operation to pen-up operation described later and a curve that interpolates the positions), storing the stroke data in a memory, which is not illustrated, and displaying the stroke data on a screen through rendering.

The drawing application according to the present embodiment functions to select, by a so-called lasso tool, part or all graphic data being displayed. When a user activates the lasso tool, the drawing application enters a state of being ready to receive input of a range selected with the stylus 2. When the user inputs a closed curve with the stylus 2 under this state, the drawing application enters a state of selecting a shape or the like within a region surrounded by the closed curve.

In the example of FIG. 1, the user moves, with the lasso tool being activated, the pen point of the stylus 2 from a position P0 to a position P1, which are illustrated in FIG. 1, along a dashed line L in the operation surface of the computer 3A. The dashed line L is a closed curve including an intersection P2 as illustrated in FIG. 1. This means that, with this movement, the closed curve is input with the stylus 2. In response to input of the closed curve as described above, the drawing application selects graphic data GD surrounded by the input closed curve ("ABC" of FIG. 1). In the present embodiment, the thus selected graphic data GD corresponds to "data to be transmitted.". Note that, the graphic data GD that is the data to be transmitted may be one or more pieces of stroke data indicating a line segment surrounded by a curve specified by the lasso tool, one or more pieces of stroke data indicating a line segment intersecting the curve, or rasterized image data.

The computer 3A transmits the graphic data GD selected by the lasso tool to the stylus 2. Although the details are described later, this transmission is executed with the use of an uplink signal in a stylus detection period in which a pen signal indicates that the stylus 2 is present within a predetermined distance from the operation surface of the computer 3A. The stylus 2 that has received the graphic data GD transmitted by the computer 3A temporarily stores the received graphic data GD in a memory 24a described later.

Transmitting the graphic data GD in the stylus detection period will now be described. With this, the graphic data GD is prevented from being transmitted even though the stylus 2 is not present at a position at which the stylus 2 can receive the graphic data GD, to thereby be leaked. It is therefore possible to reduce a possibility that the graphic data GD having a large data amount is intercepted, even when transmission/reception of the graphic data GD through transmission with an uplink signal requires time, with the result that the stylus 2 is moved out of a communicable region during transmission.

After that, when the user moves the stylus 2 to the operation surface of the computer 3B as indicated by a dashed line with an arrow A of FIG. 1 and performs a predetermined operation (for example, touches the operation surface with the stylus 2) in a state where the computer 3B is executing the same drawing application, the graphic data is transmitted (forwarded) from the stylus 2 to the computer 3B with a pen signal. The drawing application of the computer 3B performs processing of pasting the thus received graphic data within a drawing region so that the intersection P2 is positioned at a touch position P3 of the stylus 2 at that time.

The specific configurations of the stylus 2 and computer 3 for executing theses operations are now described in detail with reference to the drawings.

Figure 2:
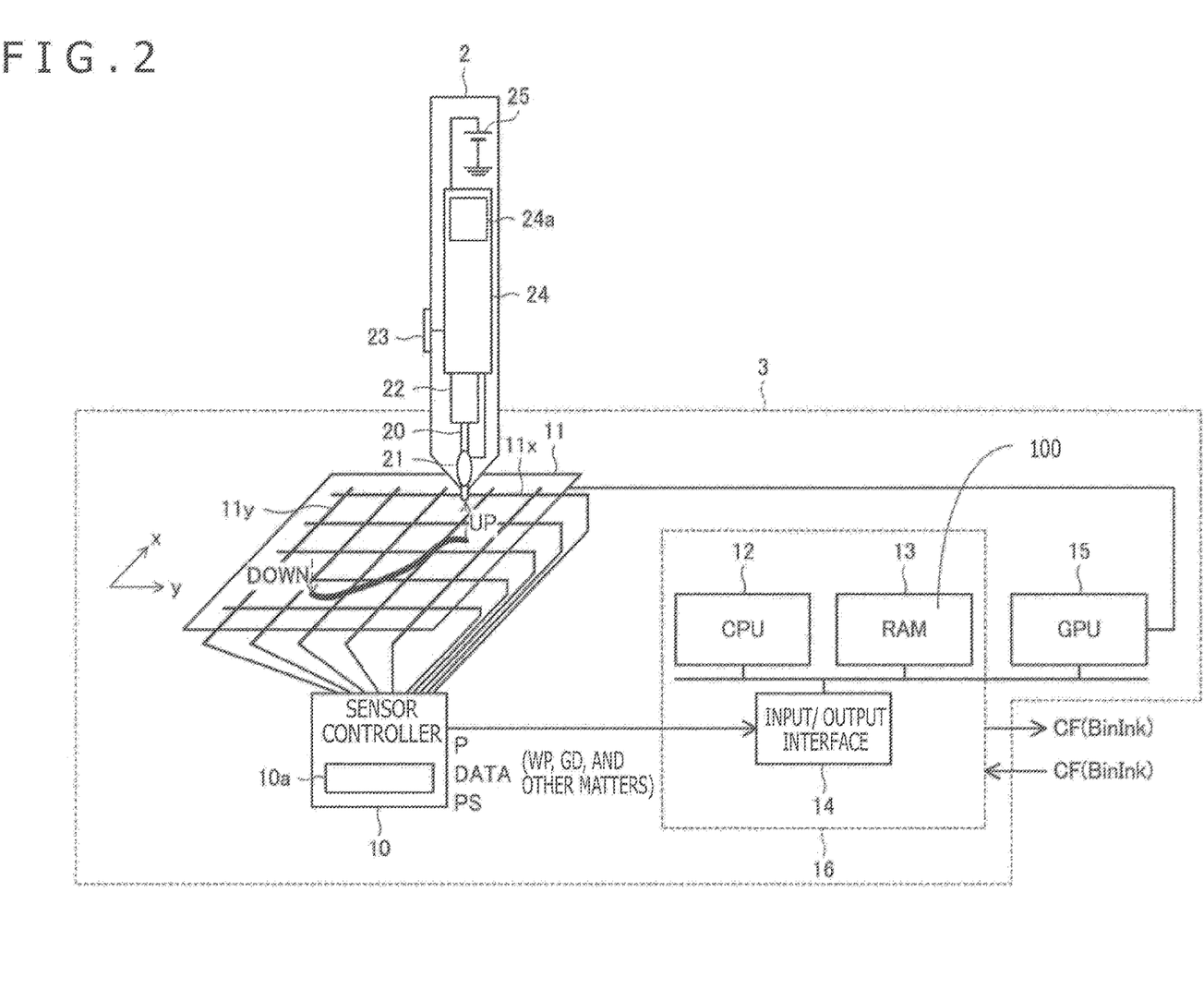
FIG. 2 is a diagram illustrating the configurations of a stylus and computer according to the first embodiment of the present disclosure.

FIG. 2 is a diagram illustrating the configurations of the stylus 2 and computer 3 according to the present embodiment. As illustrated in FIG. 2, the stylus 2 includes a core body 20, the pen point electrode 21, the pen pressure detector 22, a switch 23, a pen integrated circuit 24, and a power supply 25. Further, the computer 3 includes a sensor controller 10, the sensor electrode group 11, a central processing unit (CPU) 12 (host processor), a random access memory (RAM) 13, an input/output interface 14, and a graphics processing unit (GPU) 15. Although not illustrated, the computer 3 further includes a display, such as a liquid crystal display.

Attention is first given to the stylus 2. The core body 20 is a rod-like member placed so that the longitudinal direction of the core body 20 is matched with the pen-axis direction of the stylus 2, and corresponds to the pen point of the stylus 2. A conductive electrode that is provided at the tip portion of the core body 20 corresponds to the pen point electrode 21. The trailing end portion of the core body 20 is in abutment against the pen pressure detector 22. The pen pressure detector 22 detects the pen pressure value WP that depends on pressure that is applied to the tip of the core body 20 (pen pressure that is applied to the core body 20) when the pen point of the stylus 2 is pressed on the operation surface of the computer 3, for example. In the specific example, the pen pressure detector 22 includes a variable capacitance module whose capacitance is changed depending on pen pressure.

The pen point electrode 21 is a conductor placed near the pen point and is electrically connected to the pen integrated circuit 24 by the internal wiring of the stylus 2. When the pen integrated circuit 24 supplies a pen signal to the pen point electrode 21, charges depending on the supplied pen signal are induced in the pen point electrode 21. With this, a change in capacitance occurs in the sensor electrode group 11 described later, and the computer 3 detects the change to receive the pen signal. Further, when an uplink signal transmitted by the computer 3 arrives at the pen point electrode 21, charges depending on the arrived uplink signal are induced in the pen point electrode 21. The pen integrated circuit 24 detects the charges induced in the pen point electrode 21 in this way to receive the uplink signal.

The switch 23 is a side switch provided on the side surface of the casing of the stylus 2, for example, and has a function of an input interface configured to receive operation by the user. Specifically, the switch 23 outputs switch information indicating one of two states, that is, on and off, depending on the state of operation (pressing) by the user.

The pen integrated circuit 24 is a microprocessor having built therein the memory 24a, and functions to receive the uplink signal that is transmitted by the computer 3 and generate the pen signal including the burst signal and data signal described above, thereby transmitting the pen signal. Transmission of the uplink signal and reception of the pen signal are both executed through the pen point electrode 21 as described above.

The pen integrated circuit 24 that has received the uplink signal determines, on the basis of the reception timing of the uplink signal, the transmission schedule of the pen signal, specifically, a plurality of time slots that are used in pen signal transmission until reception of a next uplink signal. The pen integrated circuit 24 first transmits the pen signal including the pen ID and then transmits the pen signal including another data with the use of the determined plurality of time slots.

The thus transmitted "another data" is the pen pressure value WP or the switch information in a related-art stylus. In the present embodiment, however, in addition to these matters, the "another data" may further include the above-mentioned graphic data GD (or the fragmented data thereof) itself, a response signal indicating that the graphic data GD (or the fragmented data thereof) has been received, and information indicating that transmission of the graphic data GD is ready. This point is described in more detail later.

Here, the pen ID is data having a large size, and hence the stylus 2 may transmit the whole pen ID immediately after detection of the computer 3 and thereafter transmit a pen ID hashed on the basis of a known hash function shared between the stylus 2 and the computer 3 in advance. With this, the pen ID can be substantially transmitted every time the uplink signal is received while a load on a communication band is prevented from becoming heavier.

The power supply 25 supplies operating power (direct current (DC) voltage) to the pen integrated circuit 24 and includes, for example, a cylindrical AAAA battery.

Attention is next given to the computer 3. The sensor electrode group 11 includes a plurality of electrodes 11x and 11y arranged on the operation surface of the computer 3. In a case where the display surface of the display is used as the operation surface, the plurality of electrodes 11x and 11y include transparent conductors placed on the display surface or conductors placed on the rear side of the display surface. As illustrated in FIG. 2, the plurality of electrodes 11x are each extended in a y direction (a direction in the operation surface) and are arranged at regular intervals in an x direction (a direction orthogonal to the y direction in the operation surface). Further, the plurality of electrodes 11y are each extended in the x direction and are arranged at regular intervals in the y direction.

The sensor controller 10 is an integrated circuit that is connected to the sensor electrode group 11, and includes a memory 10a. The sensor controller 10 has roles of receiving a pen signal through the sensor electrode group 11, to thereby detect the position of the stylus 2 in the operation surface and receive the various pieces of data (pen pressure value WP, graphic data GD, and other matters) that the stylus 2 has transmitted. Further, the sensor controller 10 also has roles of referring to the pen pressure value WP received from the stylus 2, to thereby detect that the stylus 2 is newly brought into contact with the operation surface ("DOWN" illustrated in FIG. 1) and that the stylus 2 is moved out of the operation surface ("UP" illustrated in FIG. 1).

The sensor controller 10 outputs, every time the pen signal is received, position data P indicating the detected position, data DATA indicating the received various pieces of data, and a pen state PS indicating the state of the stylus 2 to the input/output interface 14. The pen state PS includes a pen-down state indicating that the stylus 2 is newly brought into contact with the operation surface, a pen-move state indicating that the stylus 2 is held in contact with the operation surface, and a pen-up state indicating that the stylus 2 is moved out of the operation surface.

The sensor controller 10 further has a role of transmitting an uplink signal through the sensor electrode group 11. The thus transmitted uplink signal includes the above-mentioned graphic data GD (or the fragmented data thereof) in addition to commands indicating various instructions to the stylus 2. This point is also described in more detail later.

The CPU 12, the RAM 13, and the input/output interface 14 are components of a digital ink processing unit (processor) 16 configured to execute various processing processes on digital ink 100 including one or more pieces of stroke data. To be specific, the CPU 12 executes processing of generating the digital ink 100 in the RAM 13 on the basis of the data supplied from the sensor controller 10 to the input/output interface 14, and encoding the generated digital ink 100 by a predetermined encoding method. Further, the CPU 12 executes processing of archiving a binary stream BinInk including the encoded digital ink 100 in a container file CF in a predetermined format, to thereby output the container file CF to outside the device.

Here, the digital ink 100 is data that simulates handwriting that is left on paper, for example, with the use of a writing material such as an ink pen or a pencil and is expressed by ink, pencil powder, or other materials. The digital ink 100 includes at least one stroke data. The stroke data is data that is generated by a pointing device, such as the stylus 2, being moved. The stroke data expresses, for example, a geometric shape (features on two-dimensional graphics) based on how the stylus 2 is slid on the operation surface in a period from when the stylus 2 is brought into contact with the operation surface (DOWN of FIG. 1) to when the stylus 2 is moved out of the operation surface (UP of FIG. 1) (referred to as "trajectory," "path," or "stroke," for example).

The CPU 12 further executes processing of receiving input of the container file CF in which the binary stream BinInk including the encoded digital ink 100 has been archived, and decoding the digital ink 100 in the container file CF by a predetermined decoding method, to thereby reconstruct the digital ink 100 in the RAM 13.

The CPU 12 further has a role of executing the drawing application described above. Processing that the CPU 12 executes on the basis of this drawing application is also described in more detail later.

The GPU 15 functions to execute rendering of the digital ink 100 generated or reconstructed in the RAM 13, and supply the resultant to the operation surface (display). With this, drawing with the digital ink 100 is executed.

Figure 3:
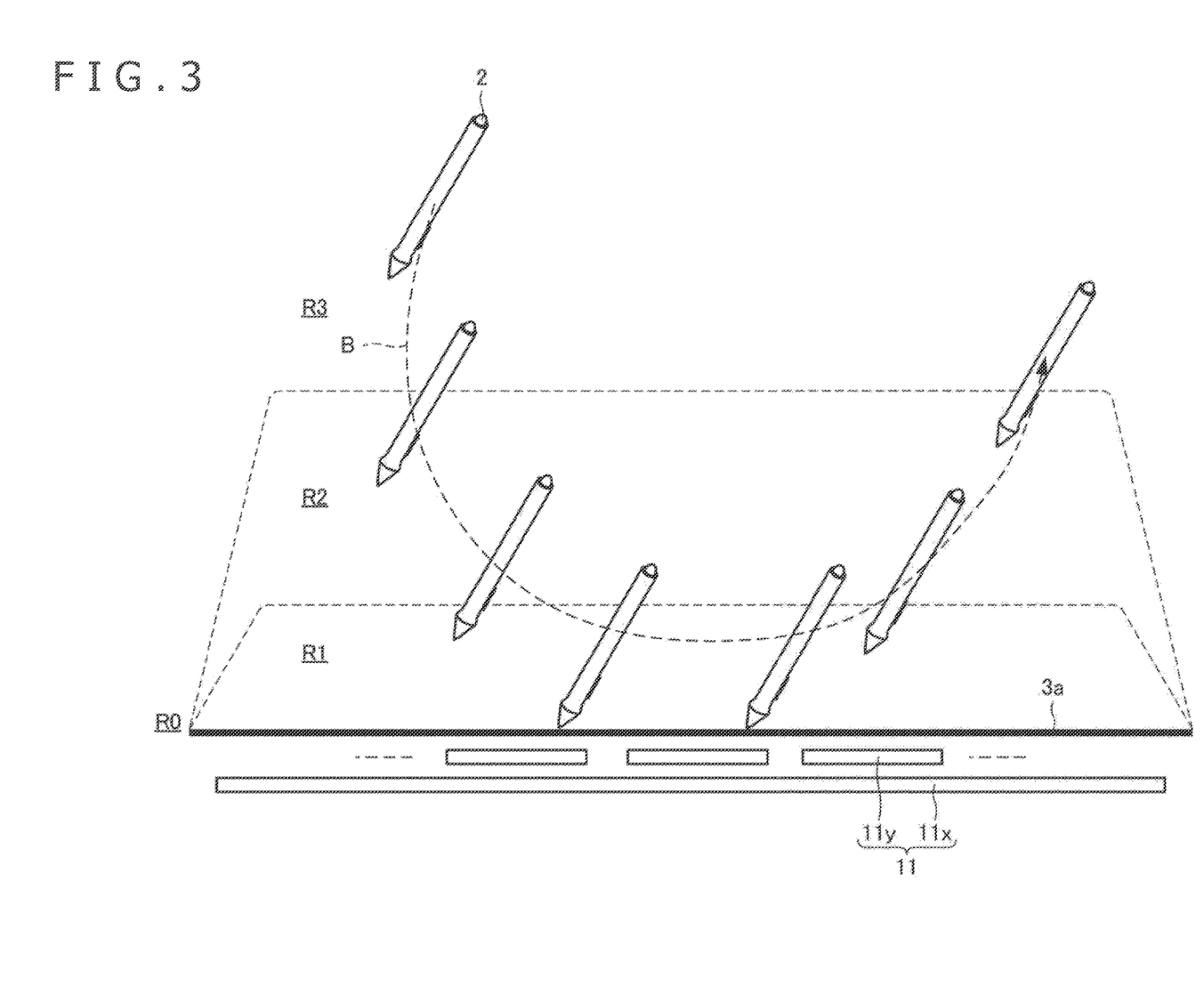
FIG. 3 is a diagram illustrating the cycle of operation by the stylus illustrated in FIG. 2.

FIG. 3 is a diagram illustrating the cycle of operation by the stylus 2 (pen operation cycle). With reference to FIG. 3, four regions R0 to R3 that are conceptually set on an operation surface 3a of the computer 3 are now described.

First, the region R3 is a region farther from the operation surface 3a than the regions R0 to R2 are. When the pen point electrode 21 of the stylus 2 is present within the region R3, an uplink signal that the sensor controller 10 has transmitted does not reach the stylus 2 and a pen signal that the stylus 2 has transmitted does not reach the sensor controller 10.

Next, the region R2 is a region second farthest from the operation surface 3a. When the pen point electrode 21 of the stylus 2 is present within the region R2, an uplink signal that the sensor controller 10 has transmitted reaches the stylus 2 but a pen signal that the stylus 2 has transmitted does not reach the sensor controller 10. Such a difference between the uplink signal and the pen signal is due to a difference in signal transmission power between the sensor controller 10 and the stylus 2.

Next, the region R1 is a region third farthest from the operation surface 3a. When the pen point electrode 21 of the stylus 2 is present within the region R1, an uplink signal that the sensor controller 10 has transmitted reaches the stylus 2 and a pen signal that the stylus 2 has transmitted reaches the sensor controller 10. The pen signal reaches the sensor controller 10, and hence the sensor controller 10 can detect the stylus 2. In other words, when the stylus 2 is present within the region R3 or R2, the sensor controller 10 cannot detect the stylus 2.

Finally, the region R0 is a region in which the pen point of the stylus 2 is in contact with the operation surface 3a. Similar to the case where the pen point electrode 21 of the stylus 2 is present within the region R1, when the pen point electrode 21 of the stylus 2 is present within the region R0, an uplink signal that the sensor controller 10 has transmitted reaches the stylus 2 and a pen signal that the stylus 2 has transmitted reaches the sensor controller 10. The region R0 is different from the region R1 in that, in the region R0, the pen pressure value WP that is detected by the pen pressure detector 22 of the stylus 2 is a numerical value larger than 0. The sensor controller 10 can grasp that the stylus 2 is present within the region R0 when receiving, with the pen signal, the pen pressure value WP that is a numerical value larger than 0.

With reference to FIG. 4 to FIG. 7, how each device operates when performing processing of copying/pasting the graphic data GD between the two computers 3A and 3B through the stylus 2 is now described in detail. Note that, in FIG. 4 to FIG. 7, the black circles added to the arrows representing signal transmission indicate that the reception side can receive the signals, and the white circles added to the arrows indicate that the reception side cannot receive the signals.

Here, the sensor controller 10 and the stylus 2 are each configured to operate in any of a normal mode, a copy mode, and a paste mode. The normal mode is a mode in which the stylus 2 normally transmits a pen signal, and the sensor controller 10 normally detects the position of the stylus 2 and receives the various pieces of data that the stylus 2 has transmitted. The copy mode is a mode in which the graphic data GD selected by the above-mentioned lasso tool is transmitted (copied) from the computer 3 to the stylus 2. The paste mode is a mode in which the graphic data GD copied to the stylus 2 in the copy mode is transmitted (pasted) from the stylus 2 to the computer 3.

Figure 4:
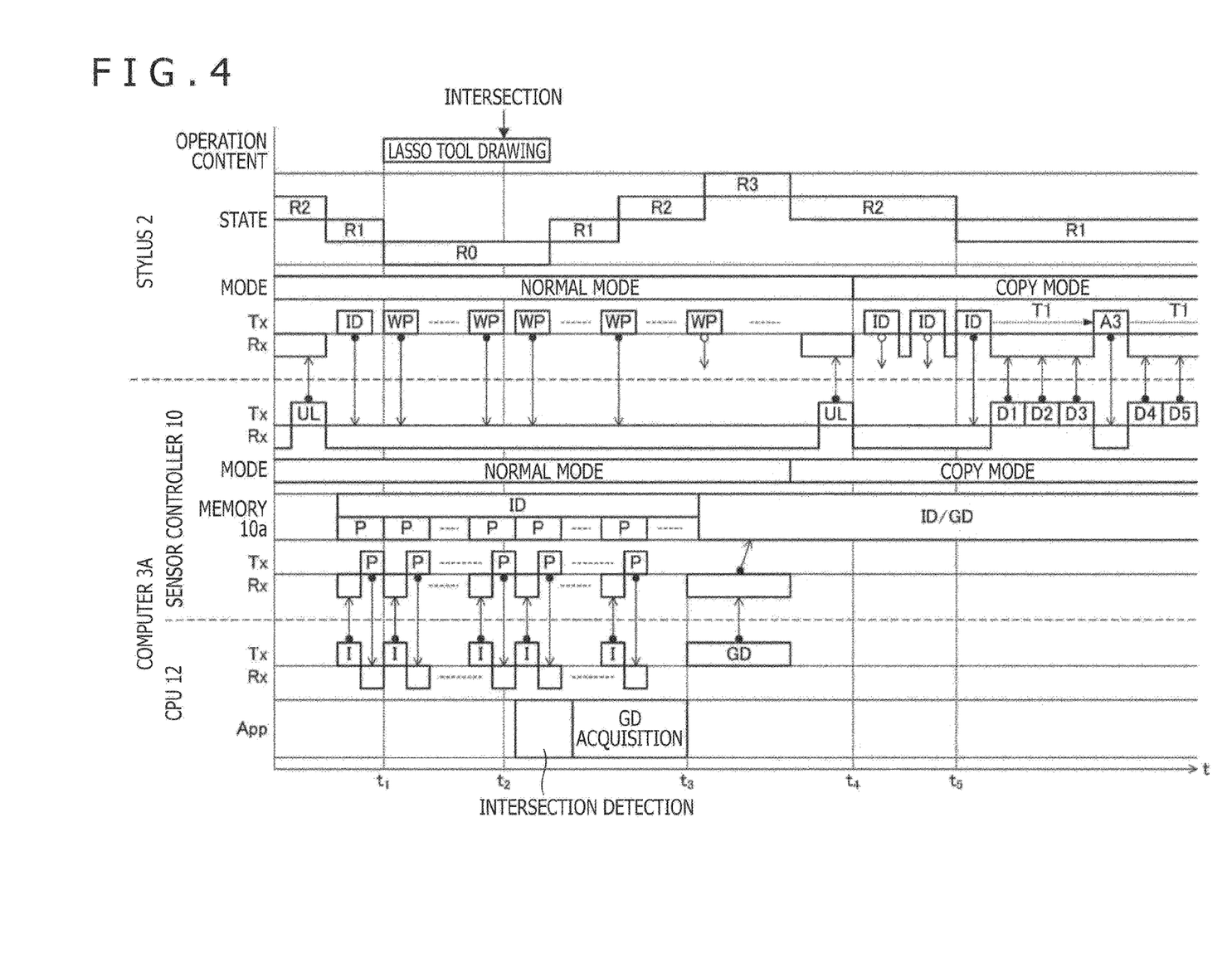
FIG. 4 is a diagram illustrating how each device operates when performing processing of copying graphic data from a computer to the stylus.
Figure 5:
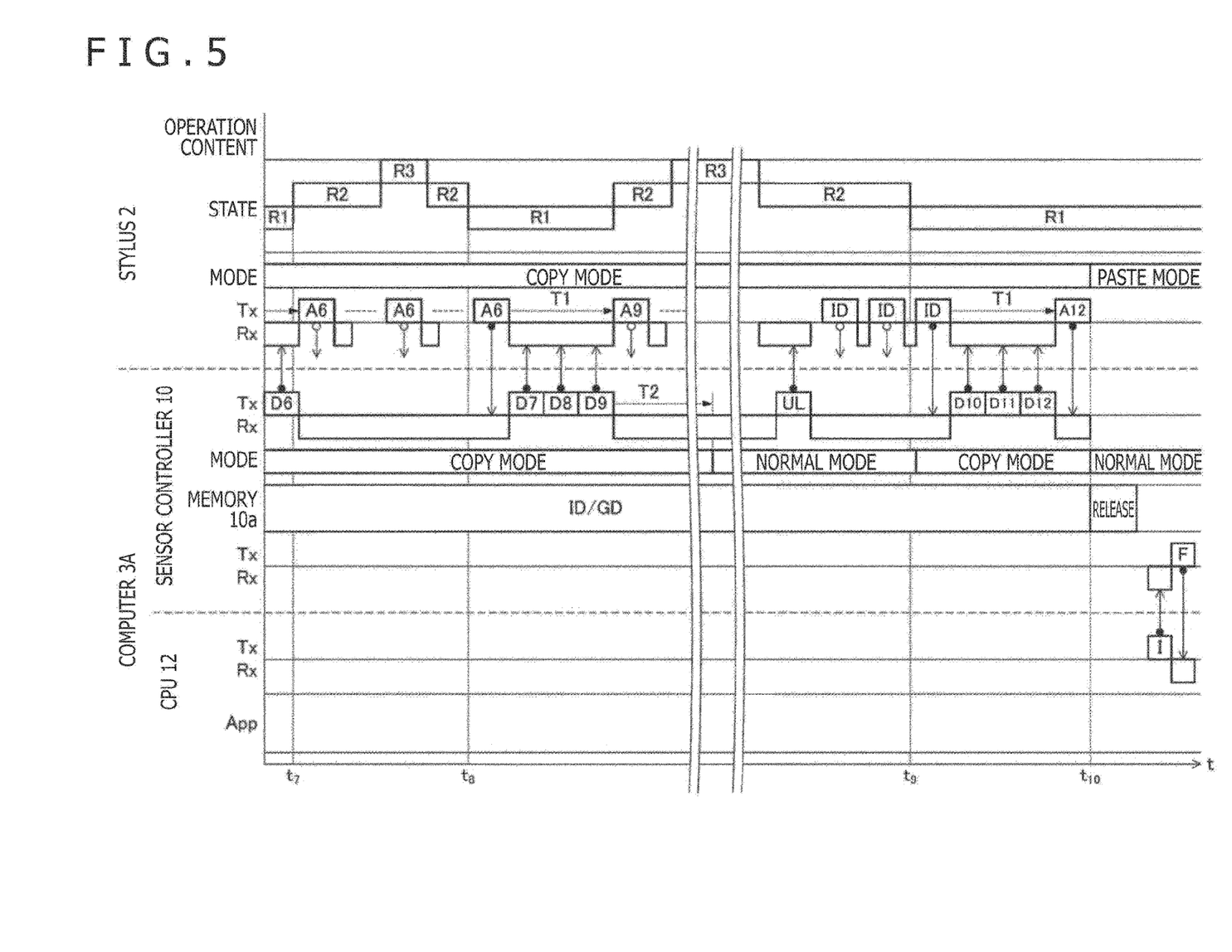
FIG. 5 is a diagram illustrating how each device operates when performing the processing of copying the graphic data from the computer to the stylus.

With reference to FIG. 4 and FIG. 5, processing of copying the graphic data GD from the computer 3A to the stylus 2 is first described. In the initial state, as illustrated in FIG. 4, the sensor controller 10 and the stylus 2 are both in the normal mode. In this case, the sensor controller 10 regularly transmits an uplink signal UL including a command indicating data that the stylus 2 is supposed to transmit. The stylus 2 that has received this uplink signal UL determines the above-mentioned transmission schedule (specifically, a plurality of time slots that are used in pen signal transmission), and transmits, as a response to the uplink signal UL, a pen signal including a burst signal and a data signal including the pen ID (or the hash value thereof).

Subsequently, the stylus 2 transmits, in each of the determined plurality of time slots, the pen signal including the burst signal and the data signal including the data to be transmitted in response to the command (here, pen pressure value WP). The thus transmitted pen signal is received by the sensor controller 10 as long as the stylus 2 is present within the region R0 or R1. FIG. 4 illustrates an example in which, after the pen signal has been transmitted a plurality of times, the stylus 2 is moved to the region R3, and the sensor controller 10 can no longer receive the pen signal.

Every time the sensor controller 10 receives the pen signal from the stylus 2, the sensor controller 10 derives the position of the stylus 2 in the operation surface on the basis of the power of the burst signal in the pen signal, which is received in each of the electrodes $11x$ and $11y$, and temporarily stores the position in the memory $10a$. Further, the sensor controller 10 demodulates the data signal in the pen signal, to thereby receive the various pieces of data (pen ID, pen pressure value WP, and other matters) that the stylus 2 has transmitted. Then, the sensor controller 10 reports the position data P indicating the derived position and the received various pieces of data to the CPU 12. Note that, FIG. 4 only illustrates, of the position data P and the various pieces of data, the report of the position data P. Reporting is executed through polling by the CPU 12. A signal I illustrated in FIG. 4 represents an interrogation signal for this polling.

The sensor controller 10 also performs processing of storing, when receiving the pen ID from the stylus 2, the received pen ID in the memory $10a$. The sensor controller 10 stores the pen ID in this way, thereby being paired with the stylus 2. Note that, the sensor controller 10 that has been paired with the stylus 2 once preferably does not exit the paring state until the user explicitly cancels paring or a predetermined period of time has elapsed since reception of the last pen signal from the stylus 2.

Incidentally, in the example of FIG. 4, the user moves the stylus 2 to bring the pen point into contact with the operation surface at a time point $t_1$, and then draws a curve with the use of the above-mentioned lasso tool. The CPU 12 refers to the pieces of position data P that are sequentially supplied from the sensor controller 10, to thereby receive input of this curve, and draws the curve on the display, which is not illustrated.

When an intersection occurs in the input curve at a time point $t_2$, the CPU 12 detects this intersection. Occurrence of the intersection means that the input curve is now a closed curve, and the CPU 12 acquires graphic data surrounded by this closed curve as the graphic data GD to be transmitted. Then, when acquisition of the graphic data GD is complete at a time point $t_3$, the CPU 12 supplies the acquired graphic data GD to the sensor controller 10. The sensor controller 10 stores the thus supplied graphic data GD in the memory 10a in association with the pen ID.

The sensor controller 10 enters the copy mode thereafter, and transmits, to the stylus 2, the uplink signal UL including a command indicating that copying is to be performed. The stylus 2 that has received this uplink signal UL enters the copy mode at a time point $t_4$, and first transmits a pen signal including the pen ID (or the hash value thereof). This pen signal may or may not include a burst signal.

The stylus 2 that has transmitted the pen signal including the pen ID (or the hash value thereof) then waits the uplink signal UL including the graphic data GD. Here, in the example of FIG. 4, the stylus 2 is positioned in the region R2 for a certain period of time from the time point $t_4$, and the pen signal thus does not arrive at the sensor controller 10. In such a case, the stylus 2 transmits the pen signal including the pen ID (or the hash value thereof) a plurality of times, and waits the uplink signal UL including the graphic data GD in every transmission.

In the example of FIG. 4, the stylus 2 is brought to the region R1 at a time point $t_5$ and the pen signal can consequently reach the sensor controller 10. The sensor controller 10 that has received the pen signal including the pen ID (or the hash value thereof) starts to transmit, in response to detection of this pen signal, the graphic data GD stored in association with the pen ID. More specifically, the sensor controller 10 compares the pen ID (or the pen ID reconstructed from the hash value) in the pen signal and the pen ID associated with the graphic data GD to each other, and starts to transmit the graphic data GD when determining that the pen IDs are identical.

Here, the data amount of the graphic data GD normally exceeds a size transmittable with one uplink signal UL. The sensor controller 10 accordingly divides the graphic data GD stored in the memory 10a into a plurality of pieces of fragmented data, to thereby sequentially transmit the pieces of fragmented data to the stylus 2. Data signals D1 to D12 illustrated in FIG. 4 and FIG. 5 represent 12 pieces of fragmented data that are transmitted in this way. The data signals D1 to D12 are each data having a size smaller than that of the graphic data GD. Note that, as a matter of course, the number of the fragmented data is not limited to 12.

When receiving the fragmented data, the stylus 2 stores the fragmented data in the memory 24a illustrated in FIG. 2, and transmits a pen signal including a response signal including information indicating the latest one of the pieces of fragmented data received in sequence (specifically, of the plurality of pieces of fragmented data sequentially received from the first fragmented data with no failure, fragmented data that has been received last). The stylus 2 transmits this pen signal including the response signal at an interval of a predetermined time T1. Here, it should be noted that the size of the fragmented data and how pieces of information indicating a fragmented state are numbered are not determined on the basis of end to end communication between the CPU 12 and the stylus 2, but are determined in accordance with a communication protocol through capacitive coupling capacitance between the sensor controller 10 and the stylus 2.

FIG. 4 illustrates an example of a case where the time T1 corresponds to transmission time of three pieces of fragmented data. In this case, the sensor controller 10 successively transmits the three pieces of fragmented data by the time of reception of a response signal. Thus, for example, when all the pieces of fragmented data D1 to D3 have been normally received as illustrated in FIG. 4, the stylus 2 transmits a response signal A3 indicating the fragmented data D3. On the other hand, when reception of the fragmented data D2 has failed, for example, the stylus 2 transmits a response signal indicating the fragmented data D1 irrespective of whether or not the fragmented data D3 is received.

After successively transmitting the three pieces of fragmented data, the sensor controller 10 does not transmit next fragmented data until receiving a response signal. This means that the period of time from detection of the pen signal (in this case, the pen signal including a response signal) by the sensor controller 10 through the sensor electrode group 11 to successive transmission of the three pieces of fragmented data (=T1) is regarded as the stylus detection period described above. That is, the sensor controller 10 according to the present embodiment transmits the graphic data GD within the time T1 from detection of the pen signal by the sensor controller 10 through the sensor electrode group 11.

The sensor controller 10 that has received the pen signal including the response signal executes fragmented data transmission again from fragmented data next to the fragmented data indicated by the response signal in question. FIG. 5 illustrates an example in which the stylus 2 receives the pieces of fragmented data D4 to D6 transmitted in this way, and transmits a response signal A6 indicating the fragmented data D6. In this example, the stylus 2 is moved to the region R2 at the transmission timing of the response signal A6, and consequently, the sensor controller 10 cannot receive the response signal A6. In this case, the sensor controller 10 stops fragmented data transmission as described above while keeping waiting response signal reception for a predetermined period. Meanwhile, after transmitting the response signal A6, the stylus 2 waits fragmented data reception. The fragmented data is, however, not received, and the stylus 2 accordingly executes transmission of the response signal A6 again. The stylus 2 repeatedly executes transmission of the response signal A6 and waiting of fragmented data reception until the fragmented data is received. At a time point $t_7$, the stylus 2 is returned to the region R1 and the response signal A6 can consequently reach the sensor controller 10, with the result that the sensor controller 10 starts to transmit next fragmented data.

When a predetermined time T2 has elapsed in a state where a response signal does not reach the sensor controller 10, the sensor controller 10 ends the copy mode once to return to the normal mode. At this time, the sensor controller 10 does not delete the pen ID and graphic data GD in the memory 10a and keeps the pen ID and the graphic data GD. The stylus 2 is kept in the copy mode.

Although not illustrated, when a predetermined period has further elapsed thereafter in the state where a response signal does not reach the sensor controller 10, the sensor controller 10 preferably deletes the pen ID and graphic data GD in the memory 10a. With this, the graphic data GD can be prevented from being leaked when the computer 3A is hacked, for example.

When the stylus 2 is returned to the region R2 after the time T2 has elapsed so that the stylus 2 can receive the uplink signal UL again, which the sensor controller 10 regularly transmits, the stylus 2 transmits a pen signal including the pen ID (or the hash value thereof), and waits reception of the uplink signal UL including the graphic data GD. The stylus 2 repeatedly executes this operation until newly receiving the uplink signal UL including fragmented data.

Note that, when the sensor controller 10 has already deleted the pen ID and graphic data GD in the memory 10a, the stylus 2 does not newly receive the uplink signal UL including fragmented data even when repeating the above-mentioned operation. Accordingly, when repeating the above-mentioned operation predetermined times, the stylus 2 may determine that the copy processing of the graphic data GD has failed and end the processing with an error.

In the example of FIG. 5, at a time point $t_9$ that comes before the sensor controller 10 deletes the pen ID and graphic data GD in the memory 10a, the stylus 2 is returned to the region R1 and a pen signal including the pen ID arrives at the sensor controller 10. In response to this, when the sensor controller 10 confirms that the pen ID in the pen signal is the pen ID of the stylus 2 to which the graphic data GD has been transmitted, the sensor controller 10 executes transmission of the subsequent pieces of fragmented data D10 to D12. The stylus 2 that has received the last fragmented data D12 in this way transmits a pen signal including a response signal A12 indicating the fragmented data D12 and ends the copy mode to enter the paste mode. The sensor controller 10 that has received the response signal A12 ends the copy mode to enter the normal mode. The sensor controller 10 deletes the pen ID and graphic data GD in the memory and supplies, to the CPU 12, a signal F indicating completion of copying to the stylus 2. The CPU 12 that has received the signal F ends the copy processing in the drawing application.

Figure 6:
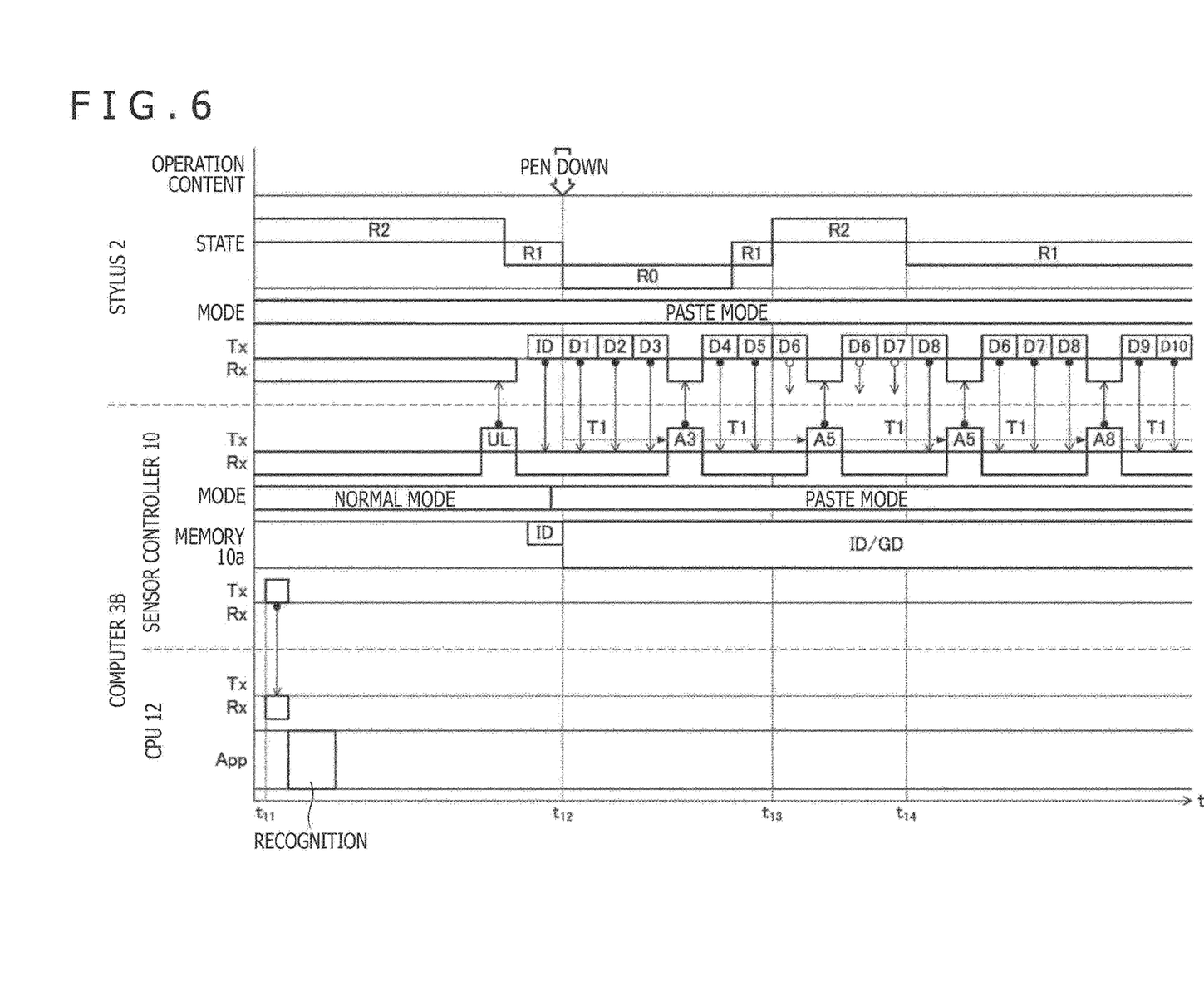
FIG. 6 is a diagram illustrating how each device operates when performing processing of pasting the graphic data from the stylus to a computer.
Figure 7:
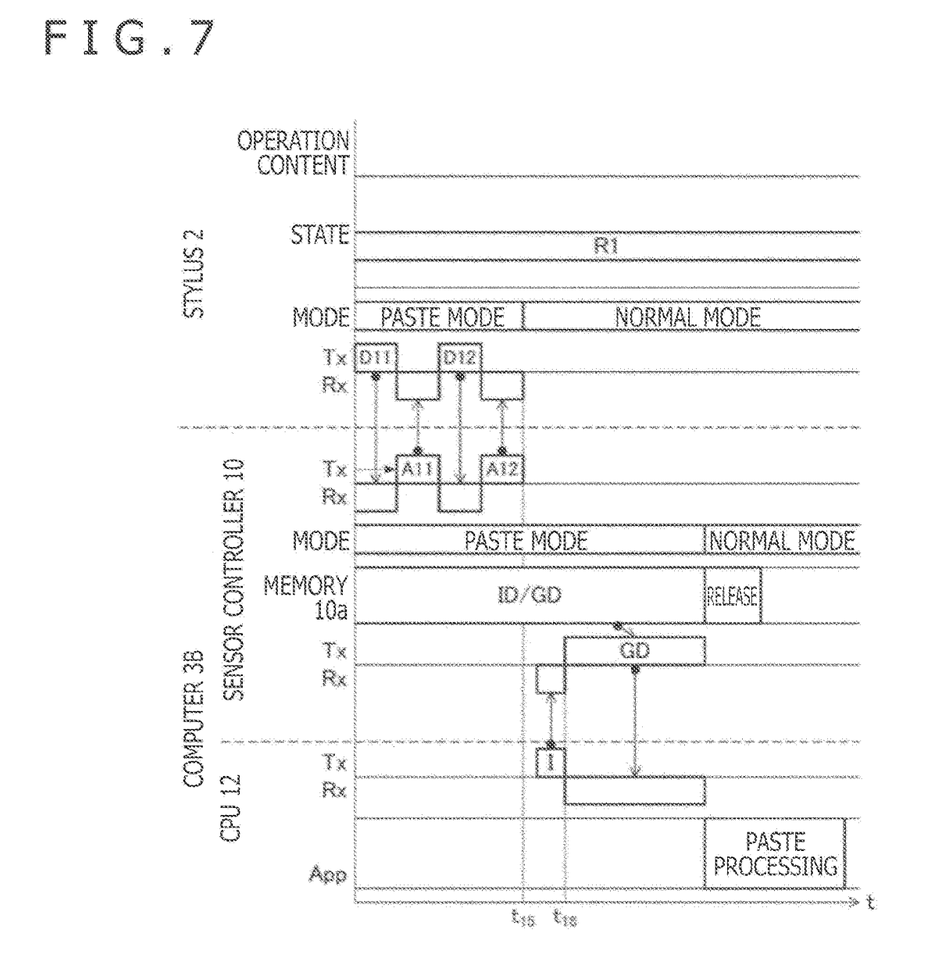
FIG. 7 is a diagram illustrating how each device operates when performing the processing of pasting the graphic data from the stylus to the computer.

With reference to FIG. 6 and FIG. 7, processing of pasting the graphic data GD from the stylus 2 to the computer 3B is next described. Note that, processing at a time point $t_{11}$ of FIG. 6 is processing that is performed prior to execution of the paste processing, and through this processing, the sensor controller 10 notifies the CPU 12 that the sensor controller 10 supports copy/paste processing through the stylus 2. The CPU 12 receives this notification to recognize that the graphic data GD may be supplied from the sensor controller 10.

When the stylus 2 in the paste mode receives the uplink signal UL that the sensor controller 10 has transmitted, the stylus 2 transmits a pen signal including the pen ID and information indicating that the stylus 2 is ready to transmit the graphic data GD. Note that, a pen signal including the pen ID and a pen signal including the information indicating that the stylus 2 is ready to transmit the graphic data GD may be transmitted separately. The sensor controller 10 that has received the thus transmitted one or plurality of pen signals stores the received pen ID in the memory 10a, and enters the paste mode.

Subsequently, the stylus 2 starts to transmit the plurality of pieces of fragmented data stored in the memory 24a, with a trigger being predetermined operation made by the user (time point $t_{12}$). The pieces of fragmented data are subsequently transmitted from the leading fragmented data with the use of pen signals. Every time the sensor controller 10 receives the thus transmitted fragmented data, the sensor controller 10 stores the received fragmented data in the memory 10a in association with the pen ID.

FIG. 6 illustrates an example in which pen down operation is utilized as the predetermined operation that is the trigger for starting transmission. The stylus 2 in this case starts to transmit the fragmented data with a trigger being a timing at which the pen pressure value WP detected by the pen pressure detector 22 illustrated in FIG. 2 reaches a value larger than 0. Operation other than the pen down operation may be utilized as the above-mentioned predetermined operation as a matter of course, and the stylus 2 may start to transmit the fragmented data with a trigger being a timing at which the user presses the switch 23 (see FIG. 2) of the stylus 2, for example.

A specific fragmented data transmission/reception method may be the same as the method of transmitting fragmented data from the computer 3A to the stylus 2. Specifically, when receiving fragmented data, the sensor controller 10 preferably stores the fragmented data in the memory 10a and transmits an uplink signal including a response signal including information indicating the latest one of the pieces of fragmented data received in sequence. Moreover, transmission of this uplink signal including the response signal is preferably executed at predetermined time intervals. Further, when the response signal is not received at a timing at which the response signal is supposed to be received, preferably, the stylus 2 does not transmit next fragmented data.

In the example of FIG. 6, the stylus 2 is moved from the region R1 to the region R2 at a time point $t_{13}$ at which the fragmented data D6 is transmitted. In this case, the fragmented data D6 does not reach the sensor controller 10, and hence a response signal that the stylus 2 receives from the sensor controller 10 after transmitting the fragmented data D6 is a response signal A5 indicating the fragmented data D5. The stylus 2 that has received this response signal A5 determines that transmission of the fragmented data D6 has failed and starts next transmission from the fragmented data D6.

In the example of FIG. 6, the stylus 2 is returned to the region R1 at the transmission timing of the fragmented data D8, and the sensor controller 10 receives the fragmented data D8. The sensor controller 10 has, however, not received the pieces of fragmented data D6 and D7. Thus, at a timing of next response signal transmission, the sensor controller 10 transmits again the response signal A5 indicating the last fragmented data D5 of the piece of fragmented data successively received. As a result, the stylus 2 executes transmission from the fragmented data D6 again. In the example of FIG. 6 and FIG. 7, the stylus 2 remains within the region R1 thereafter, and the sensor controller 10 can receive the pieces of fragmented data including the last fragmented data D12 without fail. Note that, in FIG. 7, the sensor controller 10 that has received the last fragmented data D12 transmits a response signal A12 before the time T1 has elapsed. The sensor controller 10 may, however, transmit the response signal A12 after the time T1 has elapsed.

The sensor controller 10 that has received all the pieces of fragmented data reconstructs the graphic data GD with the plurality of pieces of fragmented data stored in the memory 10a, and supplies the graphic data GD to the CPU 12 in response to the interrogation signal I. After supplying the graphic data GD, the sensor controller 10 deletes the pen ID and fragmented data in the memory 10a, and ends the paste mode to return to the normal mode. Meanwhile, the drawing application of the CPU 12 executes processing of pasting the supplied graphic data GD to display content (paste processing). With this, the copy/paste processing through the stylus 2 is complete.

As described above, with the data communication method according to the present embodiment, fragmented data is transmitted from the computer 3 only in the predetermined period (stylus detection period) after reception of a pen signal from the stylus 2. The sensor controller 10 can therefore be prevented from transmitting the graphic data GD even though the stylus 2 is not at a position at which the stylus 2 can receive the graphic data GD, to thereby leak the graphic data GD. It is therefore possible to reduce the possibility that when the graphic data GD is transmitted from the computer 3 to the stylus 2 with the use of an uplink signal, the graphic data GD is intercepted.

Further, according to the present embodiment, fragmented data is transmitted from the stylus 2 in the predetermined period after reception of an uplink signal from the sensor controller 10. The stylus 2 can therefore be prevented from transmitting the graphic data GD even though the stylus 2 is not at a position at which the graphic data GD reaches the sensor controller 10, to thereby leak the graphic data GD. It is therefore also possible to reduce the possibility that when the graphic data GD is transmitted from the stylus 2 to the computer 3 with the use of a pen signal, the graphic data GD is intercepted.

Note that, in the present embodiment, as the stylus detection period in which the sensor controller 10 performs transmission of the graphic data GD, the period that lasts for the time T1 from detection of a response signal is used, but another period may be used as the stylus detection period. For example, a period that lasts for a predetermined period of time from detection of any pen signal including a response signal may be used as the stylus detection period. Alternatively, a period in which the sensor controller 10 is being paired with the stylus 2 may be used as the stylus detection period.

Further, the sensor controller 10 may encrypt fragmented data to transmit the encrypted fragmented data. In this case, the pen ID may be used as a common key for encryption. The pen ID of the stylus 2 that is input in the copy/paste processing is information that is shared with both the computer 3 on the transmission side and the computer 3 on the reception side, and hence with the common key being the pen ID, encrypted communication can easily be performed.

Further, in the present embodiment, the graphic data GD surrounded by the closed curve is used as the data to be transmitted, but examples of the data to be transmitted according to one or more embodiments of the present disclosure may further include data designated by tapping with the stylus 2 or clicking with a mouse (including text data and graphic data).

A data communication method according to a second embodiment of the present disclosure is next described. The data communication method according to the present embodiment reduces a possibility that when a transmission control binary that is used in transmission control by the stylus 2 is transmitted from the computer 3 to the stylus 2 with the use of an uplink signal, the transmission control binary is intercepted. That is, in the present embodiment, the transmission control binary corresponds to the "data to be transmitted." Here, the transmission control binary is data that is used for determination related to the value of data that the stylus 2 transmits, determination on which of a plurality of transmission protocols is actually used, determination on pen signal waveforms (for example, transmission voltage and frequency), determination on transmission intervals, or obfuscation or encryption setting of the order of frequency hopping, for example. The transmission control binary is, for example, the firmware of the stylus 2 or another setting file. The configurations of the computer 3 and stylus 2 are the same as those described with reference to FIG. 2. In the following description, the same configurations as those in the first embodiment are denoted by the same reference symbols, and attention is given to differences from the first embodiment.

Figure 8:
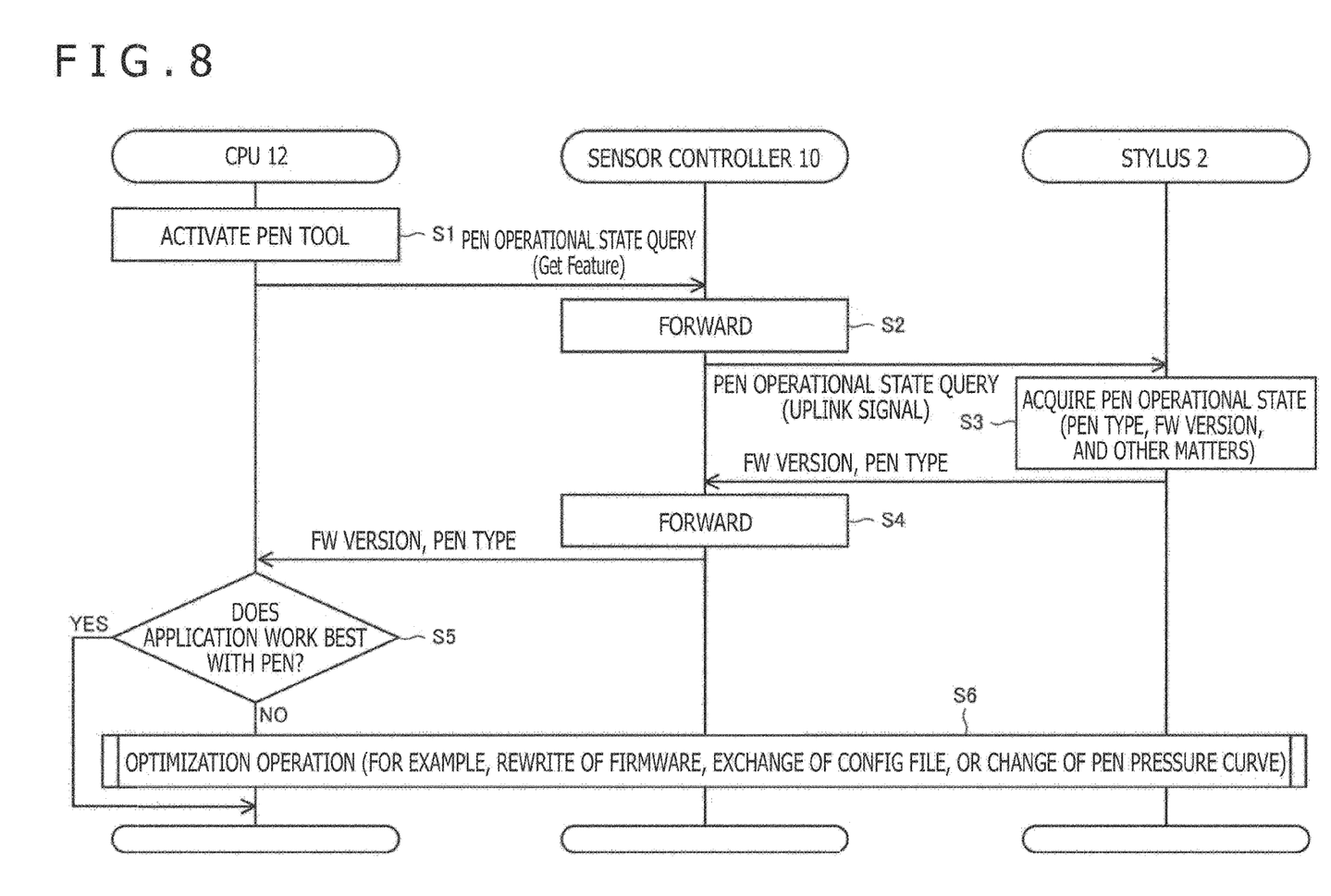
FIG. 8 is a sequence diagram illustrating a data communication method according to a second embodiment of the present disclosure.

FIG. 8 is a sequence diagram illustrating the data communication method according to the present embodiment. As illustrated in FIG. 8, in the present embodiment, first, the CPU 12 activates a pen tool that configures part of the drawing application (S1). The pen tool is software including a function for optimization of the stylus 2 and is activated in response to user operation, for example.

When the pen tool is activated, the CPU 12 issues, to the sensor controller 10, a pen operational state query (Get Feature) for acquiring a pen operational state. The sensor controller 10 receives the thus issued pen operational state query, and forwards the pen operational state query to the stylus 2 with the use of an uplink signal, which is described above (S2).

The stylus 2 demodulates the uplink signal to acquire the pen operational state query (Get Feature) and acquire what operational state (pen operational state) the stylus 2 is requested to enter by this query (S3). The thus acquired pen operational state includes a pen type, the version of firmware (FW), and other matters. The pen type is information indicating the type of the stylus 2, for example, a pencil or a brush, which is to be recognized by the drawing application. Further, the firmware is an operation program for the pen integrated circuit 24 illustrated in FIG. 2.

The stylus 2 transmits pen operational state information indicating the acquired pen operational state to the sensor controller 10 with the use of a pen signal. The sensor controller 10 receives the thus transmitted pen operational state information and forwards the pen operational state information to the CPU 12 (S4).

Subsequently, the CPU 12 determines, on the basis of the forwarded pen operational state information, whether or not the drawing application being activated (the drawing application including the pen tool activated at S1) works best with the stylus 2 (S5). Specifically, some drawing applications may only support limited pen operational states. Some drawing applications may only support, for example, the latest firmware (that is, the supported firmware version is limited to the latest one). In view of this, the CPU 12 determines that the drawing application works best with the stylus 2 when the pen operational state of the stylus 2 is matched with a limited pen operational state, and determines that the drawing application does not work best with the stylus 2 when the pen operational state of the stylus 2 is not matched with the limited pen operational state.

In a case where the CPU 12 obtains a positive determination result at S5, the CPU 12 ends the processing by the pen tool. In a case where the CPU 12 obtains a negative determination result at S5, on the other hand, the CPU 12 performs processing for optimizing the pen operational state of the stylus 2 (S6). This processing is processing for matching the pen operational state of the stylus 2 with the limited pen operational state described above. The CPU 12 first generates a user interface for prompting an update of the pen operational state, and presents the user interface to the user. The CPU 12 then executes processing of acquiring the transmission control binary described above in response to an instruction that the user makes on the user interface, and transmitting the transmission control binary to the stylus 2 through the sensor controller 10 (optimization operation).

Specific examples of data that is acquired as the transmission control binary in the present embodiment include the firmware of the stylus 2, the config file of the stylus 2, and the pen pressure curve of the stylus 2 (a curve indicating a relationship between pressure that is detected by the pen pressure detector 22 illustrated in FIG. 2 and the pen pressure value WP that is output from the pen pressure detector 22). In transmission of either of these matters, the CPU 12 and the sensor controller 10 perform transmission of the transmission control binary through processing similar to that in transmission of the graphic data GD described with reference to FIG. 4 and FIG. 5 (copy mode). Note that, in the present embodiment, it is appropriate that the mode that the stylus 2 and the sensor controller 10 enter is referred to as "upload mode" instead of "copy mode." Thus, according to the present embodiment, the possibility that the transmission control binary is intercepted can be reduced. The stylus 2 executes an update of the pen operational state with the thus transmitted transmission control binary. With this, the stylus 2 enters a pen operational state suitable for the drawing application being activated, and the user can perform pen input to the drawing application in a suitable manner.

As described above, with the data communication method according to the present embodiment, the transmission control binary for an update of the pen operational state of the stylus 2 is supplied from the computer 3 to the stylus 2 by the transmission method similar to that for the graphic data GD according to the first embodiment. The computer 3 can therefore be prevented from transmitting the transmission control binary even though the stylus 2 is not at a position at which the stylus 2 can receive the transmission control binary, to thereby leak the transmission control binary. It is therefore possible to reduce the possibility that when the transmission control binary is transmitted from the computer 3 to the stylus 2 with the use of an uplink signal, the transmission control binary is intercepted.

The various embodiments described above can be combined to provide further embodiments. These and other changes can be made to the embodiments in light of the above-detailed description. The embodiments of the present invention are described so far, but the present invention is by no means limited to these embodiments. As a matter of course, the present invention can be implemented in various modes without departing from the gist thereof. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A data communication system, comprising:
a sensor controller coupled to a host processor;
a sensor coupled to the sensor controller; and
a stylus configured to transmit a pen signal;
wherein the sensor controller is configured to report a position of the stylus to the host processor in response to detecting the pen signal by the sensor,
wherein the host processor is configured to supply data to the sensor controller,
wherein the sensor controller is configured to transmit the data to the stylus,
wherein the pen signal includes an information of firmware that is stored in the stylus,
wherein the sensor controller is configured to forward the information of firmware that is stored in the stylus to the host processor in response to detecting the pen signal, and
wherein the host processor is configured to generate, depending on the information of firmware that is stored in the stylus, a user interface for prompting a user to update the firmware.

2. The data communication system according to claim 1, wherein the stylus is configured to transmits the pen signal with an electric field by a capacitive coupling between a pen point electrode of the stylus and the sensor.

3. The data communication system according to claim 1, wherein the sensor controller is configured to transmit the data to the stylus in a stylus detection period.

4. The data communication system according to claim 3, wherein the stylus detection period includes a period in which the sensor controller is being paired with the stylus.

5. The data communication system according to claim 1, wherein the pen signal, detected by the sensor, indicates that the stylus is present within a predetermined distance from the sensor.

6. The data communication system according to claim 1, wherein the sensor controller is configured to forward the information of firmware to the host processor in response to detecting the pen signal.

7. The data communication system according to claim 1, wherein the information of firmware includes an operation program.

8. The data communication system according to claim 1, wherein the stylus is configured to start to transmit the data received from the sensor controller, in response to a predetermined user operation.

9. A computer, comprising:
a host processor;
a sensor controller coupled to the host processor;
a sensor coupled to the sensor controller;
wherein the host processor is configured to supply data to the sensor controller;
wherein the sensor controller is configured to report a position of a stylus to the host processor in response to detecting a pen signal by the sensor;
wherein the sensor controller is configured to transmit the data to the stylus in a stylus detection period,
wherein the pen signal includes an information of firmware of the stylus,
wherein the sensor controller is configured to forward the information of firmware to the host processor in response to detecting the pen signal, and
wherein the host processor is configured to generate, depending information of firmware, a user interface for prompting a user to update the firmware.

10. The computer according to claim 9, wherein the sensor controller is configured to forward the information of firmware to the host processor in response to detecting the pen signal.

11. The computer according to claim 9, wherein the sensor controller is configured to transmit the data to the stylus in a stylus detection period.

12. The computer according to claim 11, wherein the stylus detection period includes a period in which the sensor controller is being paired with the stylus.

13. The computer according to claim 9, wherein the pen signal, detected by the sensor, indicates that the stylus is present within a predetermined distance from the sensor.

14. The computer according to claim 9, wherein the sensor controller is configured to forward the information of firmware to the host processor in response to detecting the pen signal.

15. The computer according to claim 9, wherein the information of firmware includes an operation program.

* * * * *